United States Patent [19]

Duncan et al.

[11] 4,065,750

[45] Dec. 27, 1977

[54] LOW TIRE PRESSURE WARNING CIRCUIT FOR A TRACTOR/TRAILER COMBINATION

[75] Inventors: Eugene G. Duncan, Swartz Creek; James W. Spaniola, Fenton, both of Mich.

[73] Assignee: General Motors Corporation, Detroit, Mich.

[21] Appl. No.: 733,346

[22] Filed: Oct. 18, 1976

[51] Int. Cl.² ............................................. B60C 23/02
[52] U.S. Cl. ................................... 340/58; 307/10 R
[58] Field of Search ................... 340/52 F, 52 R, 53, 340/58; 180/103; 307/10 R

[56] References Cited

U.S. PATENT DOCUMENTS

| | | | |
|---|---|---|---|
| 3,215,978 | 11/1965 | Brown et al. | 340/58 |
| 3,872,424 | 3/1975 | Enabnit | 340/52 F |

*Primary Examiner*—Alvin H. Waring
*Attorney, Agent, or Firm*—Warren D. Hill

[57] ABSTRACT

A circuit is provided for a tractor/trailer combination to provide a warning in the tractor of an event such as low tire pressure occurring at the trailer utilizing only conventional wiring connections between the tractor and trailer. When low tire pressure occurs, a flasher circuit on the trailer flashes the trailer marker lamps which are normally energized so that the flashing lamps are visible to the operator. The electrical pulses in the marker lamp circuits are sensed by a detector in the tractor to illuminate an indicator lamp in the tractor. A time delay circuit controlling the flasher circuit for providing a self-check function, and for allowing manual flashing of the lamps without triggering the self-check operation.

4 Claims, 4 Drawing Figures

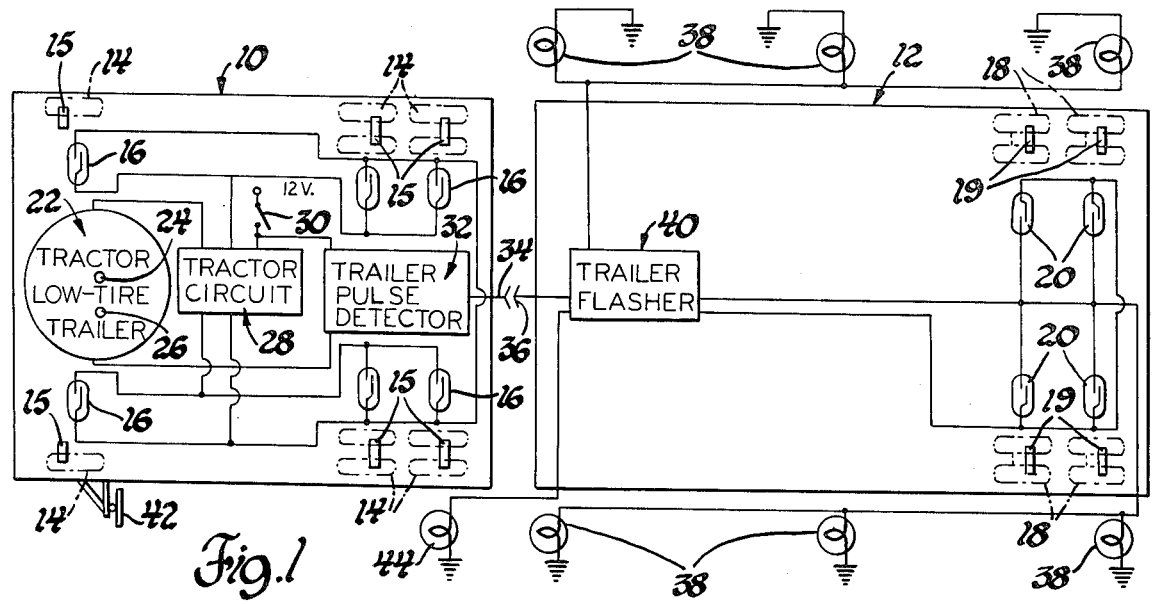
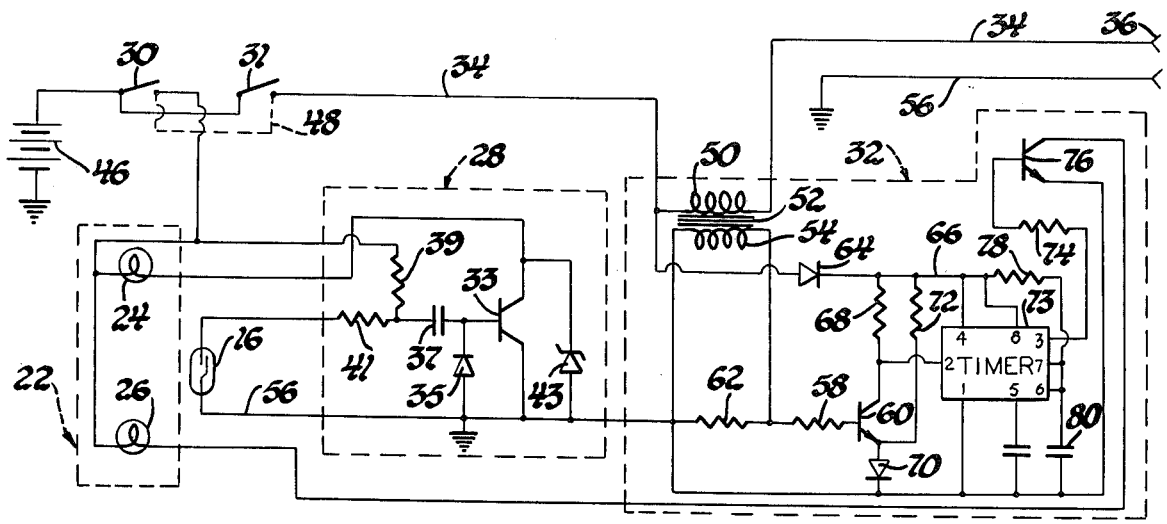
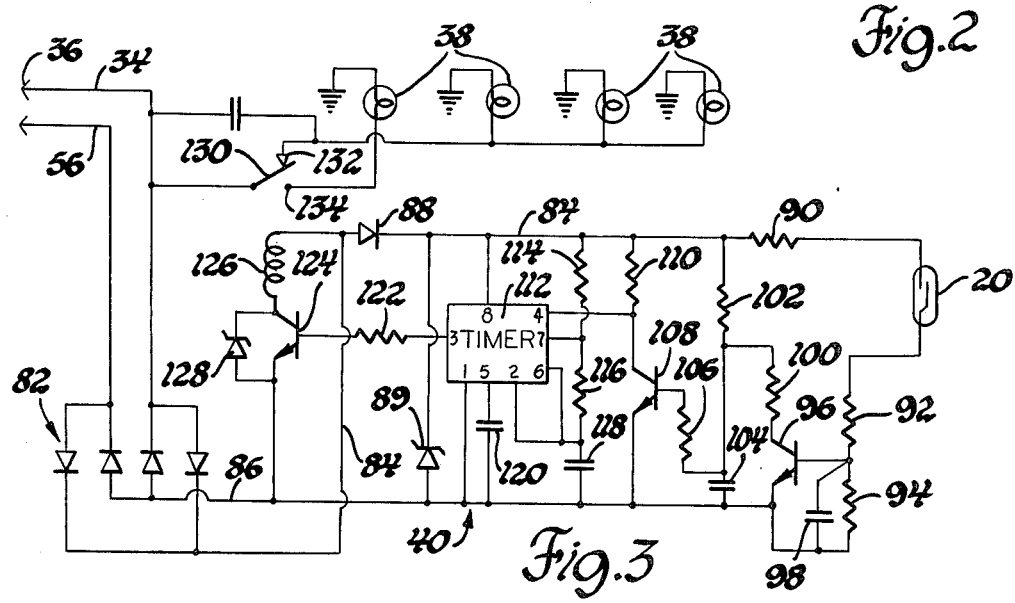

LOW TIRE PRESSURE WARNING CIRCUIT FOR A TRACTOR/TRAILER COMBINATION

This invention relates to a warning circuit for a tractor/trailer combination and particularly to such a circuit for indicating in the tractor an event occurring in the trailer.

It has been proposed to provide vehicles with low tire inflation pressure warning devices which provide an event signal from a sensor adjacent a vehicle wheel and to electrically transmit a warning signal to illuminate an indicator lamp in view of the vehicle operator. Such a system is shown in the United States patent to Lorenz et al. U.S. Pat. No. 3,977,355. Where the system is applied to the tire of a tractor/trailer combination, the warning circuit would ordinarily require special electrical connection between the tractor and trailer and in particular would require additional wires. It is customery, however, to use a standard seven wire connector between tractors and trailers so that a tractor may be used with any trailer and be electrically compatible. It is therefore desirable to employ a warning system which does not interfere with the standard wiring interconnection practice and accordingly, it is desirable to use those circuits which are traditionally used on trailers but without interfering with their traditional functions. In particular, it is desired to combine a warning system with a trailer marker lamp circuit. An object of the invention therefore is to provide in such a warning circuit the ability to manually flash the marker lamps for signalling purposes without energizing the low tire pressure warning system. It is further desired to occasionally verify the operability of the warning system. Another object of the invention then is to provide an automatic self-check function when the circuit is initially energized.

The invention is carried out by providing a low tire pressure warning circuit in combination with a signal lamp circuit, a flasher circuit in the warning circuit to provide electrical signals in the signal lamp circuit, and a time delay circuit controlling the flasher circuit to perform a self-check function upon initial circuit energization and to also prevent interruption of flashing during wheel rotation. The invention also contemplates action of the time delay circuit to permit manual flashing of the signal lamps without actuating the self-check circuit.

The above and other advantages will be made more apparent from the following specification taken in conjunction with the accompanying drawings wherein like reference numerals refer to like parts and wherein;

FIG. 1 is a block diagram of a warning circuit for a tractor/trailer combination according to the invention;

FIG. 2 is a schematic drawing of the tractor portion of the circuit of FIG. 1; and FIG. 3 is a schematic drawing of the trailer portion of the circuit of FIG. 1.

Referring to FIG. 1, the full line blocks 10 and 12 depict a tractor and a trailer respectively. The tractor wheels 14 have associated therewith low tire pressure sensors 15 magnetically coupled with reed switches 16. While the complete pressure warning device for each tire involves more than a reed switch, the reed switch does form the sensor portion on the vehicle body. The above mentioned patent to Lorez et al. provides the details of the low pressure warning sensors 15. The trailer wheels 18 are monitored by the sensors 19 and the reed switches 20. A display panel 22 in the tractor contains indicator lamps 24 and 26 for the tractor and trailer respectively. A tractor circuit 28 connected to the reed switches 16 sense closure of any of the switches and causes flashing illumination of the indicator lamp 24. A switch 30 supplies electrical power from a battery to the tractor circuit 28. A trailer pulse detector circuit 32 also receives electrical power through the switch 30 and transmits that power through a conductor 34 by way of a connector 36 to the marker light circuit of the trailer.

For the system to be operable, the switch 30 must be closed to turn on the marker lights 38 during daytime as well as night time driving. The lamps 38 are connected to the conductor 34 through a trailer flasher 40. The flasher 40 monitors the condition of the reed switches 20 and when any switch is closed, causes flashing of the marker lamps, which flashing is visible to the vehicle operator through a rear view mirror 42. If desired, an optional high intensity lamp 44, directed toward the mirror 42 may be connected to and activated by the flasher. To provide a flashing indication within the tractor, however, the trailer pulse detector 32 monitors the current flowing in line 34 and when pulsation occurs due to the flasher, the pulse detector produces corresponding flashing illumination of the indicator lamp 26. To insure strong, easily detected flasher pulses, the flash rate is held to a low value so the lamps will cool between "on" periods and will draw a large spike of current when turned on.

FIG. 2 shows schematically the circuitry carried by the tractor. A battery 46 is connected to one contact of an ignition switch 30 and a marker switch 31. The ignition switch, when closed, supplies voltage to one side of the indicator lamps 24 and 26 of the display 22 as well as to the tractor circuit 28. Tractor circuit 28 includes a transistor 33 having its collector connected to one side of the tractor indicator lamp 24 and its emitter connected to the chassis ground line 56. The base of the transistor is connected to ground through a diode 35 as well as through a capacitor 37 and a resistor 39 to the ignition switch 30. The junction of the resistor 39 and capacitor 37 is connected through a resistor 41 and reed switch 16 to ground. The single reed switch shown in FIG. 2 represents all the parallel-connected reed switches 16 of FIG. 1. A zener diode 43 is connected across the emitter and collector of the transistor 33.

In operation when the ignition switch is first closed, a current pulse passes through the resistor 39 to charge the capacitor 37 and momentarily turn on the transistor 33 which provides a ground path for the indicator lamp 24 causing the lamp to flash. This is a self-check function to verify circuit operability. Whenever a low tire pressure occurs, the reed switch 16 will open and close once for each tire revolution. When switch 16 closes, the capacitor 37 discharges through the resistor 41, switch 16 and diode 35. Then when the switch 16 opens, the capacitor 37 charges to momentarily turn on the indicator lamp 24. Accordingly, the lamp 24 will flash once each tire revolution when the low pressure detector triggers the switch 16.

The marker switch 31, when closed, supplies voltage to the conductor 34. The trailer warning circuit is operable only when the conductor 34 is energized, therefore, an alternative wiring scheme as shown by the dotted line 48 connects the conductor 34 directly to the ignition switch 30 so that the system is energized whenever the ignition switch is closed. The provision of the separate marker switch 31 allows manual interruption of the marker circuit for signalling purposes. The conductor 34 includes the primary winding 50 of pulse transformer 52 in the trailer pulse detector 32. The secondary winding 54 is connected between a chassis ground line 56 and a resistor 58 leading to the base of a transistor 60. A resistor 62 is placed across the winding 54. The conductor 34 is connected through a diode 64 to a line 66 which is connected through a resistor 68 to the collector of the transistor 60 and the emitter is connected through a diode 70 to the ground line 56. A resistor 72 is connected between the lines 66 and the emitter of the transistor 60. An integrated circuit comprising a 555 timer 73 is connected into the circuit as a one shot multivibrator and, in addition to power connections, includes an input connected to the collector of the transistor 60 and an output line connected through a resistor 74 to the base of a transistor 76. A resistor 78 and a capacitor 80 are serially connected between lines 66 and ground and their junction point provides a bias signal to the timer 73. The transistor 76 has a grounded emitter and its collector is connected to one side of the trailer indicator lamp 26 so that the lamp is illuminated whenever the transistor 76 is conductive.

In operation, it is the purpose of the trailer pulse detector circuit to detect large current spikes generated by the flashing of the marker lamps during a warning indication and to simultaneously flash the indicator lamp 26. The primary winding 50 of the transformer preferably contains four turns while the secondary has 400 turns to transform the current pulses to a usable voltage level for the sensing circuit. The resistors 62 and 58 serve as a voltage divider which is set at a level to turn on the transistor 60 by the large voltage pulses while being insensitive to other spikes and noise present on the conductor 34. Thus provision is made to insure large spikes due to the flashing marker lamps thereby facilitating detection of the current spikes. The resistor 72 and diode 70 comprise a bias network to set and stabilize the switch point of the transistor 60. When the transistor 60 turns on, the collector voltage is lowered sufficiently to trigger the timer 73. The resistor 78 and the capacitor 80 are chosen to give an approximate 50% duty cycle at the trailer flash rate. Thus each flash of the marker lamps momentarily turns on the transistor 60 which triggers the timer or one shot multivibrator 73 for a fixed interval to turn on the transistor 76 and illuminate the indicator lamp 26. The diode 64 isolates the circuit from negative spikes on the conductor 34.

FIG. 3 schematically shows the circuit carried by the trailer. The conductor 34 and the chassis ground line 56 are both passing through the tractor/trailer connector 36 and are connected to a diode bridge 82 which provides on line 84 a positive voltage with respect to an isolated ground line 86 irrepsective of whether the tractor battery 46 has positive or negative ground. In this way, the ensuing circuit is compatible with a tractor circuit of either polarity. Zener diode 89 is connected across the lines 84 and 86 for spike suppression purposes. The line 84 which includes a diode 88 supplies power to a flasher circuit. A resistor 90, the reed switch 20, a resistor 92 and a resistor 94 are serially connected between the line 84 and the ground line 86. The reed switch 20 represents all the reed switches of FIG. 1. The junction point of the resistors 92 and 94 is connected to the base of a transistor 96 which base is also connected to ground through a capacitor 98. The transistor's emitter is grounded and its collector is connected through transistors 100 and 102 to line 84. The junction of the transistors 100 and 102 is connected to ground through timing capacitor 104 and further is connected through a resistor 106 to the base of a transistor 108. That transistor has a grounded emitter and a collector connected through a resistor 110 to line 84. The collector of the transistor 108 is also connected to the input terminal of a 555 timer 112 which is connected as an astable multivibrator or flasher. Resistors 114 and 116 and capacitor 118 are serially connected between the lines 84 and 86 and the resistor junctions are connected to a terminal of timer 112 to control the timing rate of the multivibrator which sets the duty cycle. By-pass capacitor 120 connects the timer to the ground line 86. The output of the timer 112 is applied through resistor 122 to the base of transistor 124. The transistor has a grounded emitter and a collector connected through the coil 126 of a relay to the line 84. A zener diode 128 across the emitter and collector of the transistor 128 protects the transistor from negative spikes as well as large positive spikes from the relay coil 126. A movable contact 130 of the relay is connected to the conductor 34 and is normally closed against stationary contact 132 which is connected to the marker lamps 38. An auxiliary contact 134 which is engaged by the contact 130 when the relay is energized connects the optional lamp 44 to the conductor 34.

In operation, the 555 timer 112 serves as an astable multivibrator when the collector of the transistor 108 is at a high voltage to provide a pulsating output through resistor 122 of approximately 50% duty cycle to affect flashing of the marker lamps 38 and lamp 44 by periodically energizing the transistor 124 and relay coil 126. When, however, the collector of the transistor 128 is at a low potential, there is no timer output current through resistor 122. When the switch 31 is first closed to apply power to line 34, positive voltage is applied to line 84. Then the collector of transistor 108 will assume a high voltage to cause multivibrator operation and flashing of the marker lamps. Thus the circuit is tested each time when the system is turned on. After the turn on, the capacitor 104 is charged through the resistor 102 and after a time delay determined by the RC time constant, the voltage at the base of the transistor 108 increases to turn on the transistor 108, pulling its collector potential to a low value and turning off the multivibrator to place the flasher circuit in stand-by condition. Thus the self-check function terminates.

When low tire pressure is detected at one of the trailer wheels, the corresponding reed switch 20 closes so that the positive voltage from line 84 is applied through the resistors 90 and 92 to the base of the transistor 96 turning on that transistor to quickly discharge the capacitor 104 through the resistor 100. As a result, the transistor 108 is turned off and the multivibrator is turned on to cause flashing of the marker lamps. Even though the switch 20 periodically opens and closes as the wheel rotates, the flasher operation continues since the time delay established by resistor 102 and capacitor 104 does not allow the transistor 108 to conduct when the switch 20 is open for short periods. Thus the flashing rate is not interrupted, even during relatively slow wheel rotation. If, however, the vehicle comes to a stop and switch 20 remains open, the time delay circuit will time out to turn off the multivibrator. In the event it is desired to flash the marker lamps 38 by manually opening and closing the marker switch 31, the capacitor 104 will tend to discharge through the base emitter circuit of transistor 108, however, the resistor 106 limits the discharge rate to a low value. Accordingly, rapid manual flashing can occur without fully discharging the capacitor 104 and activating the self-check function. Thus the time delay circuit has one rate for charging the capacitor 104 through the resistor 102, a second rate for discharing the capacitor through resistor 106, and still another rate for discharging through resistor 100. That time delay circuit then has the three fold function of maintaining flashing during wheel rotation, self-check upon initial turn on, and temporarily disabling the self-check during manual flashing of the marker lamps.

It is important that the flash rate of the multivibrator be slow enough to substantially cool the marker lamps 38 during each off period. This allows the production of a large current spike each time the lamps are turned on. It is well known that the lamp filaments have a low resistance when cool and thereby draw a large current, and as the filaments become hot, the resistance quickly rises and the current level decreases. Thus by using a low flash rate, the lamps are allowed to cool between flashes and large current spikes are produced which are easy to detect by the trailer pulse detector 32.

It will be seen then that the circuit according to this invention is compatible with standard tractor/trailer connectors and no additional wiring is necessary. Further due to the flashing marker lamps, a visual signal is available to the truck operator even in the event the tractor is not equipped with the pulse detector circuitry and low tire pressure indicator.

The embodiment of the invention in which an exclusive property or privilege is claimed are defined as follows:

1. In a tractor/trailer electrical circuit having an electrical power supply carried by the tractor and signal lamps carried by the trailer, a low tire pressure warning circuit for indicating in the tractor a low tire pressure event occurring in a trailer tire comprising
   a conductive path for supplying electrical power from the power supply to energize the signal lamps,
   means for sensing a low tire pressure event occurring in a trailer tire at each revolution of the low pressure tire and providing a corresponding pulsed event signal,
   a flasher circuit connected to the said conductive path and effective when enabled for repetitively opening and closing the conductive path to periodically energize the lamps, whereby each time the lamps are energized a current pulse is produced in the conductive path,
   a time delay means repsonsive to the pulsed event signal for continuously enabling the flasher circuit for a preset time after an event signal so that the flasher circuit operation continues without interruption during tire rotation, and
   means in the tractor for indicating the said low tire pressure event occurring the trailer including an indicating lamp and means responsive to each of the said current pulses for flashing the indicating lamp.

2. In a tractor/trailer electrical circuit having an electrical power supply carried by the tractor and signal lamps carried by the trailer, a warning circuit for indicating in the tractor an event occurring in the trailer comprising
   a conductive path for supplying electrical power from the power supply to energize the signal lamps, and switch means in the conductive path to controllably apply power through the path,
   means for sensing an event occurring in the trailer and providing a corresponding event signal,
   flasher means responsive to the event signal and connected to the said conductive path for repetitively opening and closing the conductive path to flash the lamps, whereby each time the lamps are energized a current pulse is produced in the conductive path,
   means in the tractor for indicating the said event occurring in the trailer including an indicating lamp and means responsive to the said current pulses for energizing the indicating lamp, and
   a self-check circuit effective for a first short interval after the switch means is initially closed to operate the warning circuit comprising means for energizing the flasher means as soon as the switch means is closed and time delay means having a first timing period for disabling the energizing means upon expiration of the said short time interval, whereby several flashes of the indicating lamp will occur when power is initially applied to the warning circuit to verify operability of the warning circuit.

3. In a tractor/trailer electrical circuit having an electrical power supply carried by the tractor and signal lamps carried by the trailer, a warning circuit having a self-check circuit according to claim 2 wherein the time delay means has a second timing period effective when the said switch means is opened to maintain the energizing means in a disabled condition for a second short interval whereby the switch means may be quickly opened for an interval less the said second short interval and then closed to provide flashing of the signal lamps without actuating the self-check circuit.

4. In a tractor/trailer electrical circuit having an electrical power supply carried by the tractor and signal lamps carried by the trailer, a low tire pressure warning circuit for indicating in the tractor a low tire pressure event occurring in a trailer tire comprising
   a conductive path for supplying electrical power from the power supply to energize the signal lamps, manually operated switch means serially connected in the conductive path to control lamp energization,
   means for sensing a low tire pressure event occurring in a trailer tire at each revolution of the low pressure tire and providing a corresponding event signal,
   a flasher circuit connected to the said conductive path and effective when enabled for repetitively opening and closing the conductive path to periodically energize and de-energize said lamps, whereby each time the lamps are energized a current pulse is produced in the conductive path,
   a time delay circuit for enabling the flasher circuit, the time delay circuit including
   a. a capacitor
   b. a capacitor charging path through a first resistor to provide a first time delay to enable the flasher circuit during the first time delay to effect self-check operation of the flasher upon initial closure of the manually operated switch means,
   c. a first capacitor discharging path through a second resistor operable when the flasher circuit is disabled to provide a second time delay after opening of said manually operated switch means to momentarily prevent the said self-check operation to permit, during the interval of the second time delay, manual flashing of the signal lamps, d. a second capacitor discharging path through a third resistor to discharge the capacitor without significant time delay after each event signal to enable or maintain enabling of the flasher circuit, and means in the tractor for indicating the said low tire pressure event occurring in the trailer including an indicating lamp, and means responsive to each of the said pulses for flashing the indicating lamp.

* * * * *